United States Patent [19]
Ernstoff et al.

[11] 3,781,465
[45] Dec. 25, 1973

[54] FIELD SEQUENTIAL COLOR TELEVISION SYSTEMS

[75] Inventors: Michael N. Ernstoff, Mar Vista; Eric R. Fehr, Los Angeles; William C. Hoffman; Richard N. Winner, both of Torrance, all of Calif.

[73] Assignee: Hughes Aircraft Company, Culver City, Calif.

[22] Filed: Mar. 8, 1972

[21] Appl. No.: 232,891

[52] U.S. Cl. .......................................... 178/5.4 BD
[51] Int. Cl. .............................................. H04n 9/12
[58] Field of Search ...................... 178/5.4 R, 5.4 BD

[56] References Cited
UNITED STATES PATENTS
| | | | |
|---|---|---|---|
| 2,727,941 | 12/1955 | Fulmer | 178/5.4 BD |
| 3,666,881 | 5/1972 | Stein | 178/5.4 BD |
| 2,638,816 | 5/1953 | Stolzer | 178/5.4 BD |

Primary Examiner—Richard Murray
Attorney—W. H. MacAllister et al.

[57] ABSTRACT

A high brightness field sequential color telvision display system utilizing electronically controllable color switching of a tri-color liquid crystal filter positioned in front of a monochrome cathode ray tube. The liquid crystal structure provides a color change in response to electronic pulses and color switching is the result of an orientation aligned in the direction of the light path or in a direction substantially normal to the light path. The orientation of the host crystal domain results in a similar orientation of associated dye domains or molecules. For each of the basic red, green and blue colors, a field sequential operation is performed by applying switching pulses so that a field is provided normal to the direction of the light path in a liquid crystal cell of the selected color. To rapidly clear a selected cell to a clear state, a field is applied substantially parallel to the light path. The color image is formed in the field sequential fashion by placing the spectral filter in front of a cathode ray tube and observing the various intensities of white light on the face of the tube through the composite filter.

3 Claims, 9 Drawing Figures

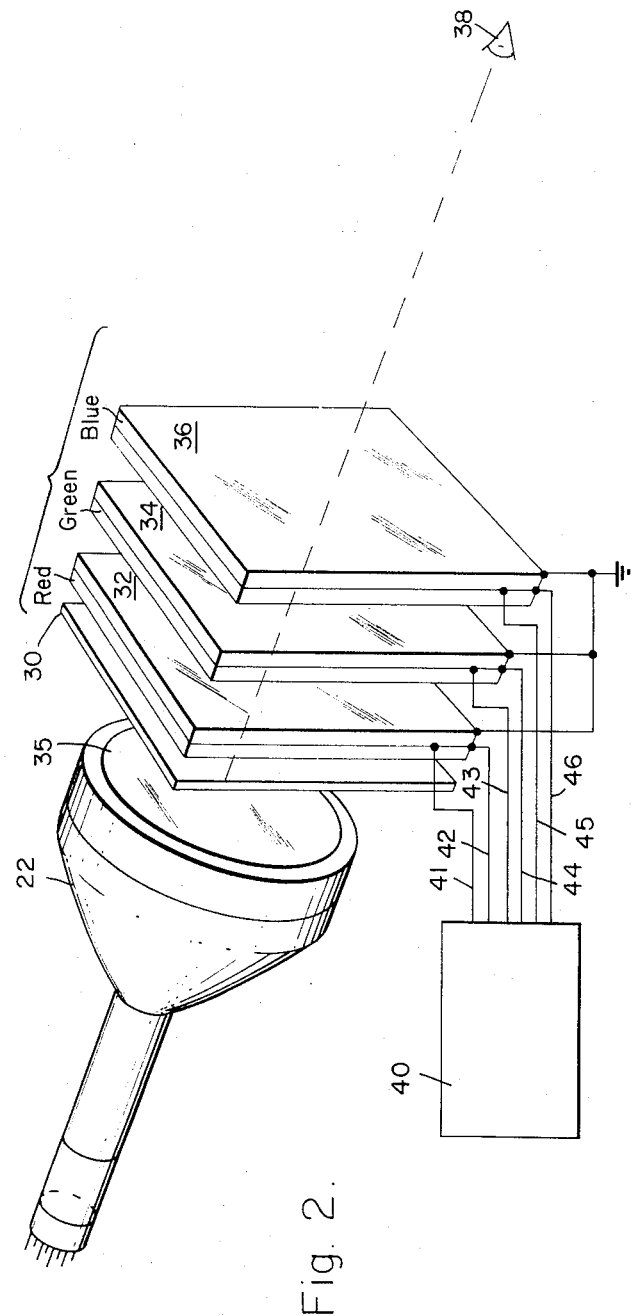
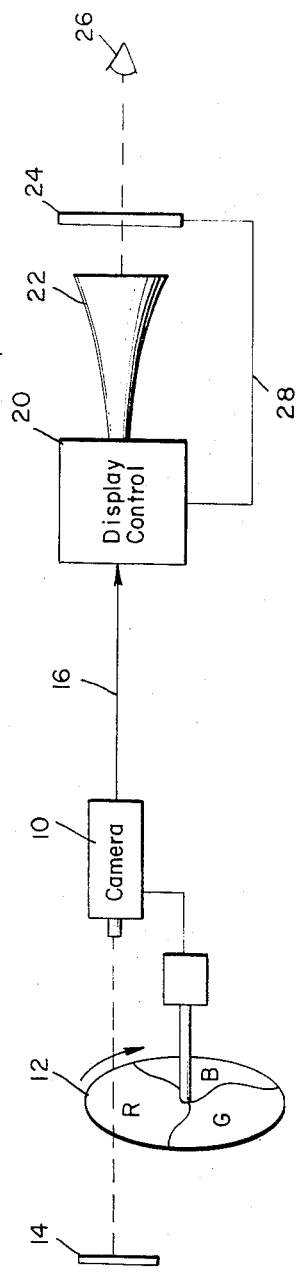
Fig. 2.
Fig. 1.

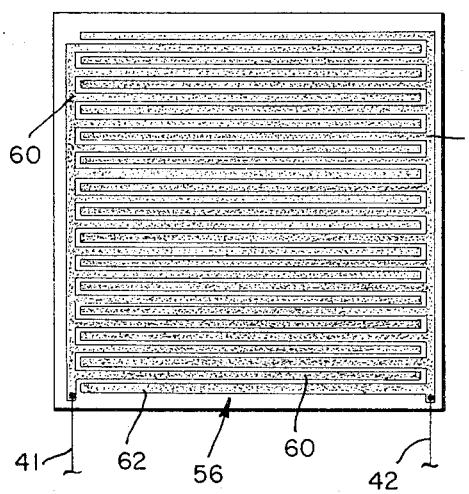
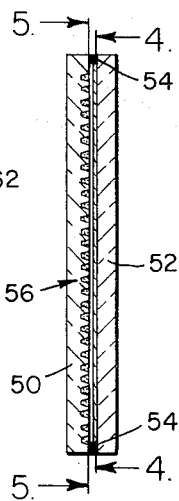
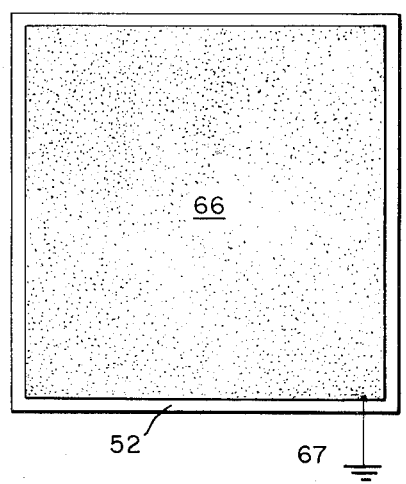
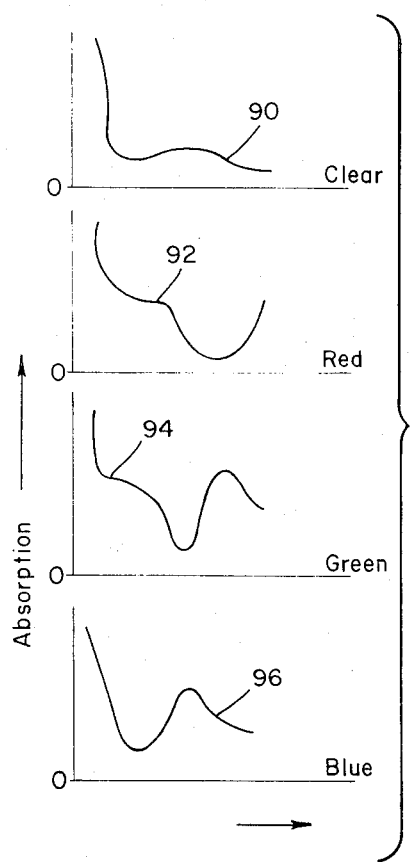
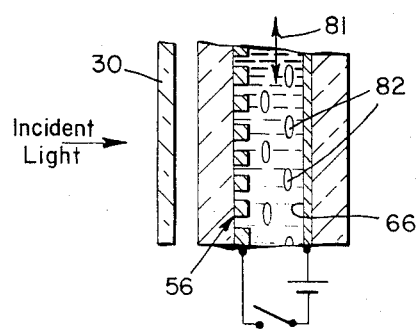
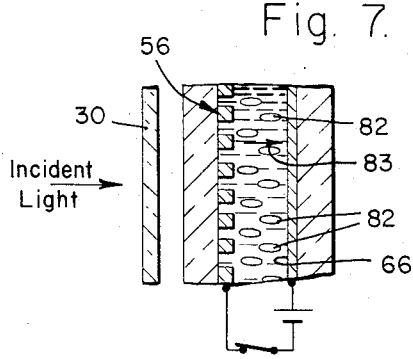

FIELD SEQUENTIAL COLOR TELEVISION SYSTEMS

The invention herein described was made in the course of or under a Contract or Subcontract thereunder with the Navy.

BACKGROUND OF THE INVENTION

1. Field of the Invention

This invention relates to display systems and particularly to an electronically controlled field sequential color television system utilizing liquid crystals and that provides a high resolution composite picture without the requirements of mechanical motion.

2. Description of the Prior Art

Conventionally, television type displays have been unable to develop a high resolution, high brightness and high quality color display when using a shadow mask technique or when using a trinoscope type color arrangement. A system that does provide a relatively high resolution, high brightness and good color picture is a field sequential color television, as is well known in the art, which operates on a basis of color pictures broken up into three sequential pictures (or six picture frames for a two to one interlace), each monochrome picture representing one of the three primary color components which are then transmitted sequentially to be recombined by the eye when viewed on the receiver. The receiver may consist of a monochrome television monitor with a set of three moving color filters sequentially passing in front of it, with the motion thereof properly synchronized so that each picture component is displayed through its associated color filter. This type of system may have an interlaced format or a format in which all adjacent lines are sequentially scanned. Because the picture components are presented at a relatively rapid rate, the images appear to the eye to fuse into a composite full color image. Another advantage of field sequential color display systems is that they will operate where environmental vibration does not permit the use of shadow mask color cathode ray tubes or trinoscope type color arrangements. When bandwidth is a problem with field sequential color television, bandwidth reduction techniques may be utilized such as described in Ser. No. 115,553, entitled, "Improved Television Display System," invented by Michael N. Ernstoff et al. and filed Feb. 16, 1971. A field sequential color television system operating without the disadvantages of mechanical motion and of large volumes required for color wheels, belts or discs to move, would be a substantial advantage to the art.

SUMMARY OF THE INVENTION

The system in accordance with the invention utilizes a liquid crystal filter including red, green and blue cells, each having a host material, and a dye of the respective color as a guest material. The composite tricolor liquid crystal filter is placed in front of a raster scanned cathode ray tube with a polarizer included in the filter on the side adjacent to the screen of the cathode ray tube. Each cell acts as a color filter when the pleochroic dye molecules are oriented parallel to the direction of polarization of the incident light and normal (or perpendicular) to the light path through the filter. A control source is provided so that the liquid crystal cells are switched to present three color fields sequentially at a rate above the flicker fusion frequency to provide a full color image to the observer. Each monochromatic field of the field sequential presentation is formed by switching the cells of the tri-color composite filter between a clear state and a colored state, with the cells so switched that for each primary color two cells are clear and one is colored at any one time. Another feature of the invention is that for rapid clearing of the cells, a potential is applied to the clear cells to help orient the molecules to the position corresponding to the clear state.

It is therefore an object of this invention to provide an improved high resolution and high brightness television display.

It is a further object of this invention to provide an electronic field sequential type color television display not requiring mechanical motion.

It is another object of this invention to provide a color display system that operates in a field sequential manner in response to electronic signals.

It is another object of this invention to provide a field sequential color television system that requires a minimum of space and components.

BRIEF DESCRIPTION OF THE DRAWINGS

These and other objects, features and advantages of the invention itself, will become apparent to those skilled in the art, in the light of the following detailed description, taken in consideration with the accompanying drawings wherein like reference numerals indicate like or corresponding parts throughout the several parts wherein:

FIG. 1 is a schematic block diagram of a camera and TV display system including the field sequential color television system in accordance with the invention;

FIG. 2 is a schematic perspective diagram further showing the field sequential color television system in accordance with the invention;

FIG. 3 is a schematic diagram looking at the end structure of one of the cells of FIG. 2 for further explaining the operation thereof;

FIG. 4 is a schematic sectional view taken at line 4—4 of the cell of FIG. 3;

FIG. 5 is a schematic sectional view of a crystal cell taken along line 5—5 of FIG. 3, showing the plane electrode utilized to rapidly change the cell to the clear condition;

FIGS. 6 and 7 are schematic diagrams showing a portion of a liquid crystal cell for a colored and for a clear condition for further explaining the operation thereof;

FIG. 8 is a schematic diagram of waveforms of the light absorption of wavelength λ for further explaining the operation of the liquid crystal cells used in the color television system of FIGS. 1 and 2.

DESCRIPTION OF THE PREFERRED EMBODIMENT

Figure 9:
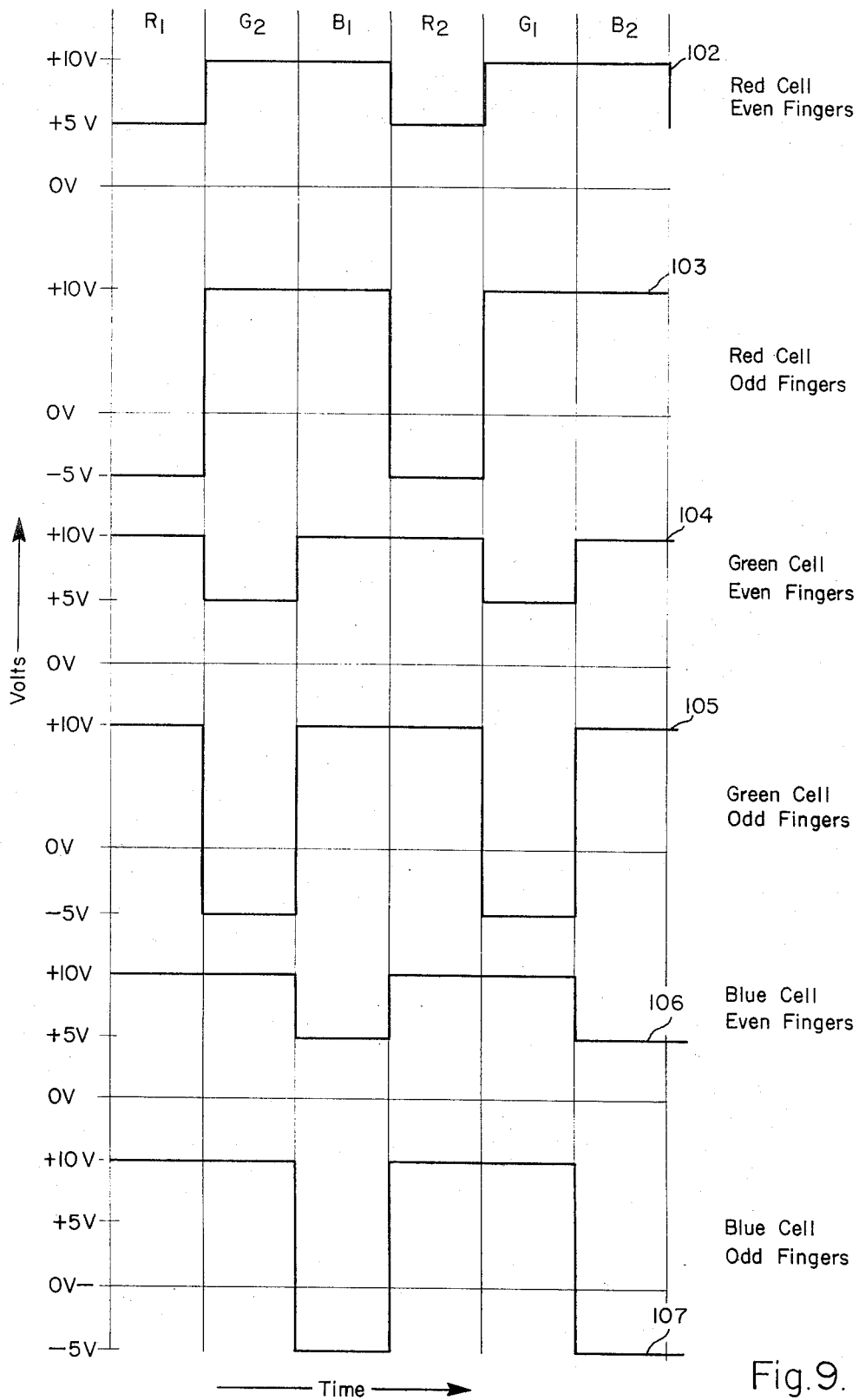
FIG. 9 is a schematic diagram of switching waveforms of voltage as a function of time for further explaining the switching operation in accordance with the invention.

Referring first to FIG. 1, the television system may include a camera 10 viewing a scene 14 through a rotating color filter wheel 12, for example, and supplying signals and synchronizing pulses over a suitable connecting lead or link 16 to a display control system 20. A suitable display tube such as a cathode ray tube 22 is scanned in a raster fashion of a plurality of fields forming a color frame to provide the scene 14. The tube 22 may be included in the display control system 20 to provide white light to a variable liquid crystal color filter 24 which sequentially provides red, green and blue basic colors to the eye of a viewer 26. In accordance with the invention the filter 24 is electronically controlled from the display control unit 20 through a suitable composite lead 28.

Referring now also to FIG. 2, the electronically switched color filter 24 is shown in greater detail including a polarizer 30 receiving white light from a surface 35 of the cathode ray tube 22 to apply polarized light to red, green and blue cells 32, 34 and 36. The polarizer has been found when operating with liquid crystal cells to increase the saturation of the color. When polarized light enters the liquid crystal cells, it is modified by either the cell 32, 34 or 36 as a result of two cells being transparent and one being in an absorptive condition. The light waves after passing through the filter 24 then pass to the viewer 38 at which point the image is combined in the eye or brain of the viewer. A switching source 40 which may be included in the display control unit 20 of FIG. 1, applies switching pulses through leads 41 to 46 for controlling the three liquid crystal cells 32, 34 and 36.

Referring now to FIGS. 3, 4 and 5, the arrangement of a typical crystal cell such as 32 will be explained in further detail. The basic cell includes a first and second glass surface 50 and 51 with a liquid crystal compound 52 maintained therebetween by a suitable sealing and spacing structure 54. A comb electrode structure 56, sometimes called an interdigital driving structure, is deposited on the inner surface of the glass plate 50 and, for example, may be of a tin oxide or gold coating and any suitable transparent conductive material. The comb electrode structure includes a first comb or finger structure 60 coupled to the lead 41 and a second comb or finger structure 62 coupled to the lead 42. The glass plate 51 has a plane electrode structure 66 deposited across the surface thereof and may, for example, be tin oxide or gold or any suitable transparent conductive material. The plate 66 may be coupled to ground through a suitable lead 67, and driving pulses may be applied to the leads 41 and 42.

In one arrangement in accordance with the invention, the same liquid crystal material may be used as a host for each of the three dyes that produce each of the three primary colors. The host liquid crystal material is a mixture of three similar materials, examples of which are described in an article in The Journal, "Molecular Crystal and Liquid Crystals," Volume 8, pages 293—304, 1969, by G. H. Heilmyer, L. A. Zinone and J. A. Castelano. The host material, a nematic liquid crystal structure which is well known in the art, has threadlike rods of organic molecules which can move from side to side and up and down as well as rotate about their long axis. For example, the host material may be p-ethoxy-benzylidene-p'-aminobemzonitrile as discussed in the above-mentioned journal. It is to be understood that the principles of the invention are not limited to nematic crystals but may include any suitable liquid crystal molecular structure that will provide the desired color switching. The pleochroic dye guest material determines the color of the cell and it may be mixed with the liquid crystal host at a ratio of approximately 1 percent guest to host material by weight, for example. A pleochroic dye has different light absorbing properties as a function of the orientation of the material relative to the light source. For the above liquid crystal host material methyl red may be utilized for the red color, indophenol blue may be utilized for the blue color and isolar green may be utilized for the green color as an illustrative example. It is to be understood that the invention is not to be limited to any particular guest and host materials but may include any compatible combinations such as described in the above-mentioned Guest- Hosts interaction article or any suitable materials having the desired color and switching properties.

Referring now to FIGS. 6 and 7, the cell 32 is shown schematically for further explaining the operation thereof. In FIG. 6 in the presence of pulses applied to the comb electrode structure 56 to develop a field of an arrow 81, the nematic molecules or domains such as 80 and the pleochroic dye molecules or domains such as 82 align normal to the light path, with the result that the dye absorbs incident light and colors the cell red for the cell 32. The molecules of the cell will return to their normal or colored state unaided after a field as shown in FIG. 7 parallel to the light path is removed, but application of the electric field of the arrow 81 normal to the light path make the transition to the color state more rapid. An applied voltage as illustrated in FIG. 7 provides a field of an arrow 83 to line up the domains 80 and the dye molecules 82 with the result that light is not absorbed and the cell takes the color of the light or is transparent. As is well known in the art, the polarizer 30 has been found to increase the saturation of the colors developed in the cells. When applying the rapid clearing electrical field of the arrow 83, the cell rapidly returns to its clear state.

Referring now also to FIG. 8, the clear condition is shown by a curve 90 having a low absorption over the color spectrum, which is a result of a potential being applied between the conductors 56 and 66, as indicated in FIG. 7. A red condition is shown with a low value of absorption at the longer wavelengths indicated by a waveform 92, the blue condition is shown by a low value of absorption at the shorter wavelengths as shown by a curve 96 and the green condition is shown as a curve 94 by a low value of absorption at the intermediate wavelengths at the green region of the spectrum.

Referring now to FIG. 9 as well as to FIG. 2, driving waveforms for an interlace condition provide a driving sequence of $R_1$, $G_2$, $B_1$, $R_2$, $G_1$ and $B_2$ as is well known in the art where the 1 refers to the upper of two lines and the 2 refers to the lower of two lines of a 2 to 1 interlace. During the $R_1$ period, the pulse applied to the even and odd finger structure of the red cell 32 through respective leads 41 and 42 is shown by waveforms 102 and 103 as being +5 volts and −5 volts to provide a field of the vector 81 of FIG. 6. The pulse applied to the even and odd finger structures of the green cell 34 as shown by waveforms 104 and 105 is high at +10 volts and the pulses applied to the blue cell 36 as shown by waveforms 106 and 107 is high at +10 volts to provide a potential between the structures such as 56 and 66. Only the red cell 32 has a normal orientation of the domains as shown in FIG. 6 and develops the red color condition. Because the average voltage across the interdigital finger structure is 0 volts (+5 and −5 volts ) there is effectively no potential between the structures 56 and 66 of the red cell 32. During the $G_2$ period only the green cell 34 does not have a potential applied from the interdigital structure to the plate and develops a green condition as a result of the +5 volt and −5 volt potentials applied to the even and odd finger structures which orients the domains so that light is not absorbed. During the $B_1$ period, only the blue cell 36 has a potential applied between its even and odd digital finger structures to develop a blue condition. It is to be noted that the clear cells result from a +10 volt potential between the finger structures and the plate, which clearing operation is rapidly formed. During the periods $R_2$, $G_1$ and $B_2$, respective red cell 32, green cell 34 and blue cell 36 are respectively the only ones that have a field applied normal to the direction of the light path. This sequence is repeated in a continuous and sequential manner in synchronism with the scan of the cathode ray tube on the surface 35.

Thus there has been described an improved field sequential color television system utilizing electronically tunable liquid crystal filters and a polarizer to improve the quality of the color. Electronically switched color filters result in reduced size and weight and increased reliability because of the absence of moving parts. Also because mechanical driving structures and rotating discs or drums are not required the system results in a very simplified arrangement. Because three liquid crystal filters must be sequentially switched at the rate of 3600, three color sequences per minute, for example, the electronic switching system in accordance with the invention provides a highly simplified and trouble free system.

What is claimed is:

1. A field sequential television display system comprising:
   a cathode ray tube having a display screen scanned in sequential fields,
   liquid crystal filter means positioned adjacent to said screen to provide a light path and including three liquid crystal cells each having dye domains to provide different color characteristics, said cells each responding to an electric field so that one cell orients the dye domains substantially normal to the light path and the other two cells orient the dye domains substantially parallel to the light path, each cell having a flat structure containing the liquid crystal and dye material and first and second interdigital conductors on one side of the structure and a plane conductor on the other side of the structure, and
   a control source coupled to said first and second digital filter means for sequentially varying the selected color as a function of said sequence of fields by applying positive and negative potentials to said first and second digital conductors of a first cell; a reference potential to said plane conductor and positive potentials to both said first and second interdigital conductors of the other cells to develop the electric fields.

2. The system of claim 1 in which a polarizer is provided between said screen and said liquid crystal filter means.

3. The system of claim 2 in which said sequence of fields has an interlace format.

* * * * *